(12) United States Patent
Ross (10) Patent No.: US 8,434,380 B2
(45) Date of Patent: May 7, 2013

(54) DUAL CLUTCH MULTI-SPEED TRANSMISSION

(75) Inventor: Craig S. Ross, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 847 days.

(21) Appl. No.: 12/615,990

(22) Filed: Nov. 10, 2009

(65) Prior Publication Data

US 2010/0186549 A1    Jul. 29, 2010

Related U.S. Application Data

(60) Provisional application No. 61/146,930, filed on Jan. 23, 2009.

(51) Int. Cl.
*F16H 3/08* (2006.01)

(52) U.S. Cl.
USPC .............................................. 74/330

(58) Field of Classification Search ............. 74/330, 74/331, 335, 340
See application file for complete search history.

(56) References Cited

U.S. PATENT DOCUMENTS

| | | | |
|---|---|---|---|
| 6,209,407 B1 | 4/2001 | Heinzel et al. | |
| 6,427,550 B1* | 8/2002 | Bowen | 74/336 R |
| 6,499,370 B2* | 12/2002 | Bowen | 74/330 |
| 6,958,028 B2 | 10/2005 | Janson et al. | |
| 7,021,169 B2 | 4/2006 | Kobayashi | |
| 7,225,696 B2 | 6/2007 | Gitt | |
| 7,240,578 B2 | 7/2007 | Ogami et al. | |
| 7,272,985 B2 | 9/2007 | Gumpoltsberger et al. | |
| 7,340,973 B2 | 3/2008 | Hiraiwa | |
| 7,367,919 B2 | 5/2008 | Fahland et al. | |
| 7,383,749 B2 | 6/2008 | Schafter et al. | |
| 7,409,886 B2 | 8/2008 | Gitt | |
| 7,437,963 B2 | 10/2008 | Haka et al. | |
| 7,448,290 B2 | 11/2008 | Gitt | |
| 2002/0088291 A1* | 7/2002 | Bowen | 74/339 |
| 2004/0025612 A1* | 2/2004 | Ahnert et al. | 74/329 |
| 2004/0144190 A1 | 7/2004 | Hall, III | |
| 2005/0115345 A1 | 6/2005 | Gumpoltsberger et al. | |
| 2005/0193848 A1 | 9/2005 | Gitt | |
| 2006/0117882 A1 | 6/2006 | Gitt | |
| 2006/0219033 A1 | 10/2006 | Gitt | |
| 2006/0225527 A1* | 10/2006 | Yang et al. | 74/330 |
| 2006/0266144 A1 | 11/2006 | Schafer et al. | |
| 2007/0022835 A1 | 2/2007 | Kilian et al. | |
| 2007/0074593 A1 | 4/2007 | Mizuno et al. | |
| 2007/0113696 A1 | 5/2007 | Haka et al. | |
| 2007/0180942 A1 | 8/2007 | Antonov | |

(Continued)

FOREIGN PATENT DOCUMENTS

| | | |
|---|---|---|
| DE | 10310472 A1 | 10/2003 |
| DE | 102006016059 A1 | 10/2007 |

(Continued)

*Primary Examiner* — Troy Chambers
*Assistant Examiner* — Michael Gonzalez (57) ABSTRACT

A transmission includes an input member, an output transfer gear, first and second shaft members, a countershaft, a reverse shaft member, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output gear.

25 Claims, 3 Drawing Sheets

U.S. PATENT DOCUMENTS

| | | |
|---|---|---|
| 2007/0214906 A1 | 9/2007 | Fahland et al. |
| 2007/0220999 A1 | 9/2007 | Hatori et al. |
| 2007/0240530 A1 | 10/2007 | Ogami et al. |
| 2007/0289399 A1 | 12/2007 | Tanba et al. |
| 2008/0034905 A1 | 2/2008 | Hatori |
| 2008/0047378 A1 | 2/2008 | Borgerson et al. |
| 2008/0047379 A1 | 2/2008 | Borgerson et al. |
| 2008/0134818 A1 | 6/2008 | Gitt |
| 2008/0134820 A1 | 6/2008 | Bjorck et al. |
| 2008/0141808 A1 | 6/2008 | Gumpoltsberger |
| 2008/0196526 A1 | 8/2008 | Singh et al. |
| 2008/0202265 A1 | 8/2008 | Hendrickson et al. |
| 2008/0202266 A1 | 8/2008 | Hendrickson et al. |
| 2008/0202267 A1 | 8/2008 | Hendrickson et al. |
| 2008/0202268 A1 | 8/2008 | Carey et al. |

FOREIGN PATENT DOCUMENTS

| | | |
|---|---|---|
| DE | 102006016397 A1 | 10/2007 |
| WO | WO2005021999 A1 | 3/2005 |
| WO | WO2005093289 A1 | 10/2005 |
| WO | WO2006106534 A1 | 10/2006 |
| WO | WO2006128626 A1 | 12/2006 |

* cited by examiner

DUAL CLUTCH MULTI-SPEED TRANSMISSION

CROSS-REFERENCE TO RELATED APPLICATIONS

This application claims the benefit of U.S. Provisional Application No. 61/146,930, filed on Jan. 23, 2009, which is hereby incorporated in its entirety herein by reference.

TECHNICAL FIELD

The present disclosure relates to transmissions and more particularly to a compact, dual clutch multiple speed transmission having two axes and a dedicated reverse shaft.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output transfer gear, first and second shaft members, a countershaft or layshaft, a reverse shaft member, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output transfer gear.

In one aspect of the present invention, the transmission includes five co-planar gear sets.

In yet another aspect of the present invention, the transmission includes a one-way clutch for selectively connecting the first gear of the third gear set to the second interconnecting member.

In yet another aspect of the present invention, the transmission includes three synchronizer assemblies.

In yet another aspect of the present invention, the three synchronizer assemblies include one one-way synchronizer and two two-way synchronizers.

In yet another aspect of the present invention, the transmission is operable to provide at least five forward speed ratios.

In still another aspect of the present invention, a transmission is provided having an input member, an output member, a first, second, third, fourth, and fifth gear set. The first gear set has a first gear and a second gear, the second gear set has a first gear and a second gear, the third gear set has a first gear and a second gear, the fourth gear set has a first gear and a second gear, the fifth gear set has a first gear, a second gear and a third gear.

A first interconnecting member continuously connects the first gear of the second and fourth gear sets. A second interconnecting member selectively connects with the first gear of the first, third and fifth gear sets. The first interconnecting member is concentric with the second interconnecting member.

A reverse shaft is spaced apart from and parallel with the first and second interconnecting members. The second gear of the fifth gear set is selectively connectable to the reverse shaft. A reverse gear is continuously connected to the reverse shaft.

A countershaft continuously connects the output member, the second gear of the third gear set, the second gear of the fifth gear set and selectively connects the second gear of the fourth gear set and third gear of the fifth gear set.

A dual clutch assembly is selectively engageable to interconnect the input member with at least one of the first interconnecting member and the second interconnecting member. The dual clutch assembly includes a first clutch for selectively connecting the input member with the first interconnecting member and a second clutch for selectively connecting the input member with the second interconnecting member.

Three synchronizer assemblies selectively couple at least one of the gears of the first, second, third, fourth and fifth gear sets with at least one of the first interconnecting member, the second interconnecting member, the reverse shaft, and the countershaft.

Moreover, the dual clutch assembly and three synchronizer assemblies are selectively engageable in combinations of at least two to establish at least five forward speed ratios and at least one reverse speed ratio between the input member and the output member. The first of the three synchronizer assemblies selectively connects the second gear of the fifth gear set to the reverse shaft to establish a reverse gear ratio. The second of the three synchronizer assemblies selectively connects one of the first gear of the first gear set and first gear of the second gear set to the second interconnecting member to establish at least one of a third and fifth gear ratio. The third of the three synchronizer assemblies selectively connects one of the second gear of the fourth gear set and the third gear of the fifth gear set to the countershaft to establish at least one of a second and fourth gear ratio.

The above features and advantages and other features and advantages of the present invention are readily apparent from the following detailed description of the best modes for carrying out the invention when taken in connection with the accompanying drawings.

DESCRIPTION

Figure 1:
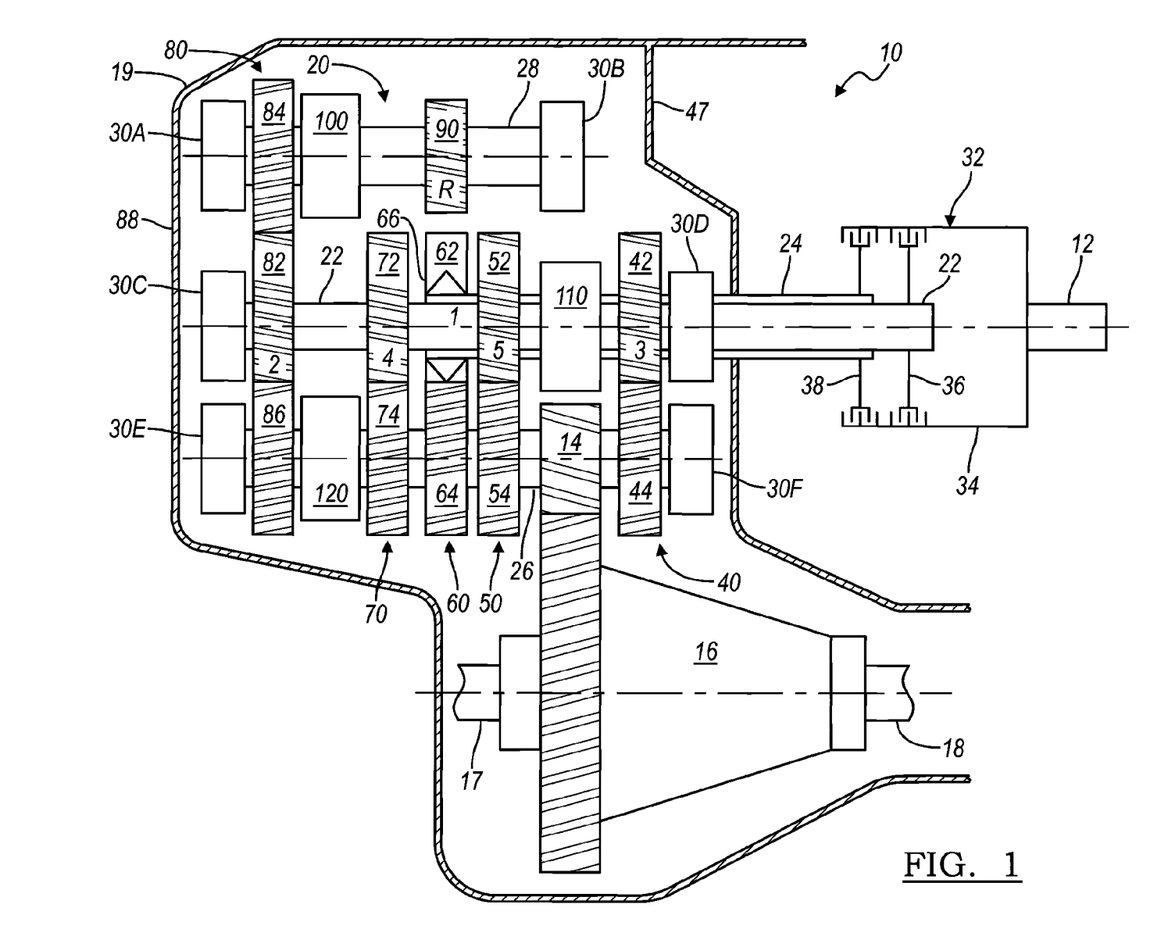
FIG. 1 is a side cross-sectional view of an embodiment of a transmission in accordance with the present invention.

Referring to the drawings, wherein like reference numbers refer to like components, in FIG. 1 a multiple speed transmission is generally indicated by reference number 10. The transmission 10 includes an input member 12 and an output member or transfer gear 14. In the present embodiment, the input member 12 is a shaft and the transfer gear 14 is a gear, however those skilled in the art will appreciate that the input member 12 may be components other than shafts and the output member 14 may be a component, such as a shaft, other than a gear.

The input member 12 is continuously connected with an engine (not shown) or other torque producing machine to provide a driving torque to input member 12. The output member or transfer gear 14 rotatably drives a final drive assembly 16. The final drive assembly 16 transfers torque delivered by transfer gear 14 to first and second side axles 17, 18, and on to road wheels (not shown) coupled to side axles 17, 18.

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first shaft or member 22, a second shaft or member 24, a layshaft 26, and a reverse shaft or member 28. The second shaft or member 24 is a sleeve shaft that is concentric with and overlies the first shaft or member 22. The layshaft 26 and the reverse member 28 are each spaced apart from and parallel with the first and second shaft members 22, 24. The first and second shafts define a first axis of rotation and the layshaft 26 defines a second axis of rotation. Shaft members 22, 24 and layshaft 26 are rotatably supported by bearings 30a, 30b, 30c, 30d, 30e and 30f.

A dual clutch assembly 32 is connected between the input member 12 and the first and second shaft members 22, 24. The dual clutch assembly 32 includes a clutch housing 34 connected for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon that interact to form a friction clutch. The clutch element 36 is connected for common rotation with the first interconnecting member 22 and the clutch element 38 is connected for common rotation with the second interconnecting member 24. Thus, selective engagement of clutch element 36 with the clutch housing 34 connects the input member 12 for common rotation with the first shaft member 22. Selective engagement of clutch element 38 with the clutch housing 34 connects the input member 12 for common rotation with the second shaft member 24.

The gearing arrangement 20 also includes a plurality of co-planar, intermeshing gear sets 40, 50, 60, 70 and 80. Co-planar gear set 40 includes gear 42 and gear 44. Gear 42 is selectively connectable for common rotation with the second shaft member 24 and intermeshes with gear 44. Gear 44 is connected for common rotation with the layshaft 26. It should be appreciated that gear 42 may be a separate gear structure fixed to the second shaft member 24 or gear teeth/splines formed on an outer surface of the second shaft member 24 without departing from the scope of the present invention. Gear set 40 is located adjacent a wall 47 of the transmission housing 19 proximate a front or side of the transmission 10.

Co-planar gear set 50 includes gear 52 and gear 54. Gear 52 is selectively connectable for common rotation with the second shaft member 24 and intermeshes with gear 54. Gear 54 is connected for common rotation with the layshaft 26. Gear set 50 is located adjacent gear set 40.

Co-planar gear set 60 includes gear 62 and gear 64. Gear 62 is selectively connectable for common rotation with the second shaft member 24 and intermeshes with gear 64. More specifically, gear 62 is mounted to a one way clutch 66 that couples gear 62 to second shaft 24. Gear 64 is connected for common rotation with the layshaft 26. Gear set 60 is disposed adjacent gear set 50.

Co-planar gear set 70 includes gear 72 and gear 74. Gear 72 is connected for common rotation with the first shaft member 22 and intermeshes with gear 74. Gear 74 is selectively connectable for common rotation with the layshaft 26. Gear set 70 is located adjacent gear set 60.

Co-planar gear set 80 includes gear 82, gear 84 and gear 86. Gear 82 is connected for common rotation with the first shaft member 22 and intermeshes with gear 84. Gear 84 is selectively connectable for common rotation with the reverse shaft 28. Gear 86 is selectively connectable for common rotation with the layshaft 26 and intermeshes with gear 82. Gear set 80 is positioned between gear set 70 and an end wall 88 of the transmission housing 19.

Reverse gear 90 is connected for common rotation with the reverse shaft member 28 and intermeshes with gear 64 of gear set 60. Reverse gear 90 is located between gear set 80 and end wall 47.

Finally, the transfer gear 14 is connected for common rotation with the layshaft 26. The transfer gear 14 is located between the co-planar gear set 40 and gear set 50.

The transmission 10 further includes a plurality of selectively engageable synchronizer assemblies 100, 110 and 120. Synchronizer 100 is a single sided synchronizer that generally include a shift fork (not shown) that is bi-directionally translated by an actuator (not shown) into one engaged position and a neutral or disengaged position. For example, synchronizer 100 is selectively engageable to connect gear 84 with the reverse shaft 28 for common rotation therewith. In a preferred embodiment, synchronizer 100 has only one actuator.

Synchronizers 110 and 120 are double sided synchronizers and generally include a shift fork (not shown) that is bi-directionally translated by an actuator (not shown) into at least two engaged positions and a neutral or disengaged position. For example, synchronizer 110 is selectively engageable to connect gear 42 with the second shaft member 24 for common rotation therewith and is selectively engageable to connect gear 52 with the second shaft member 24 for common rotation therewith. Synchronizer 120 is selectively engageable to connect gear 74 with the layshaft member 26 for common rotation therewith and is selectively engageable to connect gear 86 with the layshaft member 26 for common rotation therewith.

The transmission 10 is capable of transmitting torque from the input shaft 12 to the transfer gear 14 in at least five forward torque ratios and at least one reverse torque ratio. Each of the forward torque ratios and the reverse torque ratio is attained by selective engagement of the dual clutch assembly 32 and one or more of the synchronizer assemblies 100, 110 and 120. Those skilled in the art will readily understand that a different speed ratio is associated with each torque ratio.

It should be appreciated that each individual gear set 40, 50, 60, 70 and 80 provides one or more forward and/or reverse gear ratios upon selective engagement of the synchronizer assemblies 100, 110 and 120 and that which synchronizer and which gear set are associated with which forward or reverse speed ratio may vary without departing from the scope of the present invention.

For example, to establish the reverse torque ratio, clutch element 38 is engaged to couple the input member 12 with the second shaft member 24 and synchronizer 100 is engaged to connect gear 84 to the reverse shaft member 28. Input torque from the input shaft 12 is transferred through the dual clutch assembly 32 to the second shaft member 24, through gear 82 to gear 84, through the reverse member 28 to gear 90, from gear 90 to gear 64, and through the layshaft 26 to the transfer gear 14.

To establish a first forward torque ratio (i.e. a 1st gear), clutch element 38 is engaged to couple the input member 12 with the second shaft member 24. Input torque from the input member 12 is transferred through the dual clutch assembly 32 to the second shaft member 24 and through the one-way clutch 66 to gear 62. Gear 62 transfers torque to gear 64 which transfers the torque to the layshaft 26 and onto the transfer gear 14.

To establish a second forward torque ratio (i.e. a 2nd gear), clutch element 36 is engaged to couple the input member 12 to the first shaft member 22 which rotates gear 82. Synchronizer 120 is activated to couple gear 86 to the layshaft member 26. Accordingly, input torque from the input member 12 is transferred through the dual clutch assembly 32 to the first shaft member 22, through gear 82 to gear 86, and then through the layshaft 26 to the transfer gear 14.

To establish a third forward torque ratio (i.e. a 3rd gear), clutch element 38 is engaged to couple the input member 12 to the second shaft member 24. Synchronizer 110 is active to couple gear 42 to the second shaft member 24. One-way clutch 66 is over run disengaging gear 62 from second shaft 24. Thus, input torque from the input member 12 is transferred through the dual clutch assembly 32 to the second shaft member 24, through gear 42 to gear 44, and through the layshaft 26 to the transfer gear 14.

To establish a fourth forward torque ratio (i.e. a 4th gear), clutch element 36 is engaged to couple the input member 12 to the first shaft member 22. Input torque from the input member 12 is transferred through the dual clutch assembly 32 to the first shaft member 22 and gear 72. Synchronizer 120 is active to couple gear 74 to the layshaft member 26. Thus, torque is transferred to layshaft 26 through gear 74, and then through the layshaft 26 to the transfer gear 14.

To establish a fifth forward torque ratio (i.e. a 5th gear), clutch element 38 is engaged to couple the input member 12 to the second shaft member 24 and synchronizer 120 is engaged to couple gear 52 to the second shaft member 24. One-way clutch 66 is over run disengaging gear 62 from second shaft 24. Input torque from the input member 12 is transferred through the dual clutch assembly 32 to the second shaft member 24, through gear 52 to gear 54, and through the layshaft 26 to the transfer gear 14.

Again, it should be appreciated that which of the gear sets 40, 50, 60, 70 and 80 are associated with which forward and reverse torque ratio may be changed from the above example without departing from the scope of the present invention.

The present invention contemplates that a variety of torque ratios (i.e., the ratio of torque of the transfer gear 14 to the input member 12) are achievable through the selection of tooth counts of the gears of the transmission 10. This arrangement provides the opportunity to achieve reduced transmission length in comparison with other transmissions.

Figure 2:
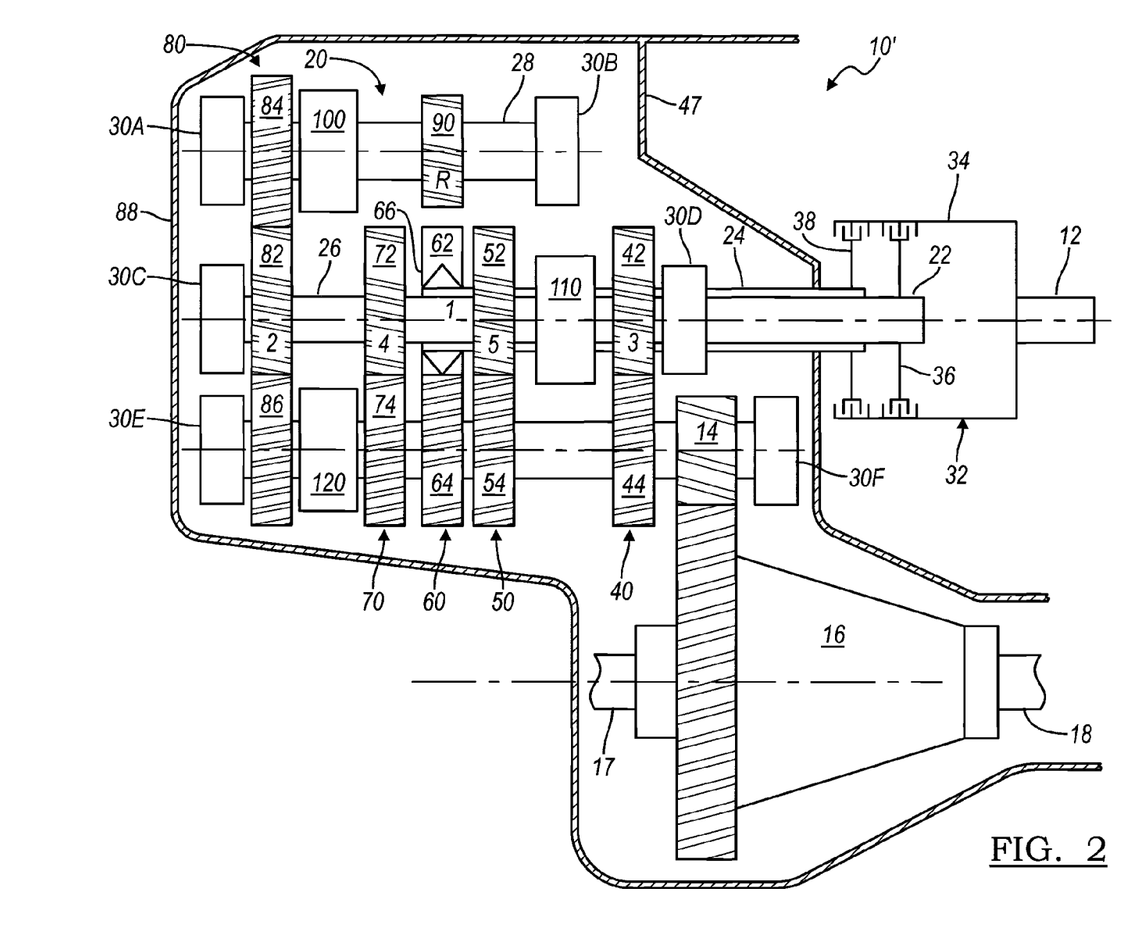
FIG. 2 is a side cross-sectional view of another embodiment of a transmission in accordance with the present invention.

Referring now to FIG. 2, another embodiment of a transmission in accordance with the present invention is provided and generally designated by reference number 10'. Transmission 10' includes the same dual clutch 32, first and second shafts 22, 24, layshaft 26, reverse shaft 28 and co-planar gear sets 40, 50, 60, 70, and 80. However, transmission 10' differs from transmission 10 in the placement and selective coupling of one of the synchronizers 100, 110 and 120. More specifically, synchronizer 100 and 120 are located as shown in the embodiment of FIG. 1 and synchronizer 110 may be disposed on the first shaft 22 as shown in FIG. 2 or alternatively on the layshaft 26 as shown in phantom lines in FIG. 2. As such, when synchronizer 110 is disposed on shaft 22, gears 52 and 42 are rotatable about first shaft 22 and are selectively coupled to first shaft 22 by synchronizer 110. Accordingly, gears 54 and 44 are rotatably fixed to layshaft 26, when synchronizer 110 is disposed on shaft 22. When synchronizer 110 is disposed on layshaft 26 gears 54 and 44 are rotatable about shaft 26 and are selectively coupled to shaft 26 by synchronizer 110. Accordingly, gears 52 and 42 are rotatably fixed to first shaft 22, when synchronizer 110 is disposed on layshaft 26.

Further, transmission 10' allows for the alternate location of synchronizer 110 on layshaft 26 by relocating transfer gear 14. In the embodiment of transmission 10' transfer gear 14 is disposed between pinion gear 44 and bearing 30f instead of between gear 44 and 54.

Figure 3:
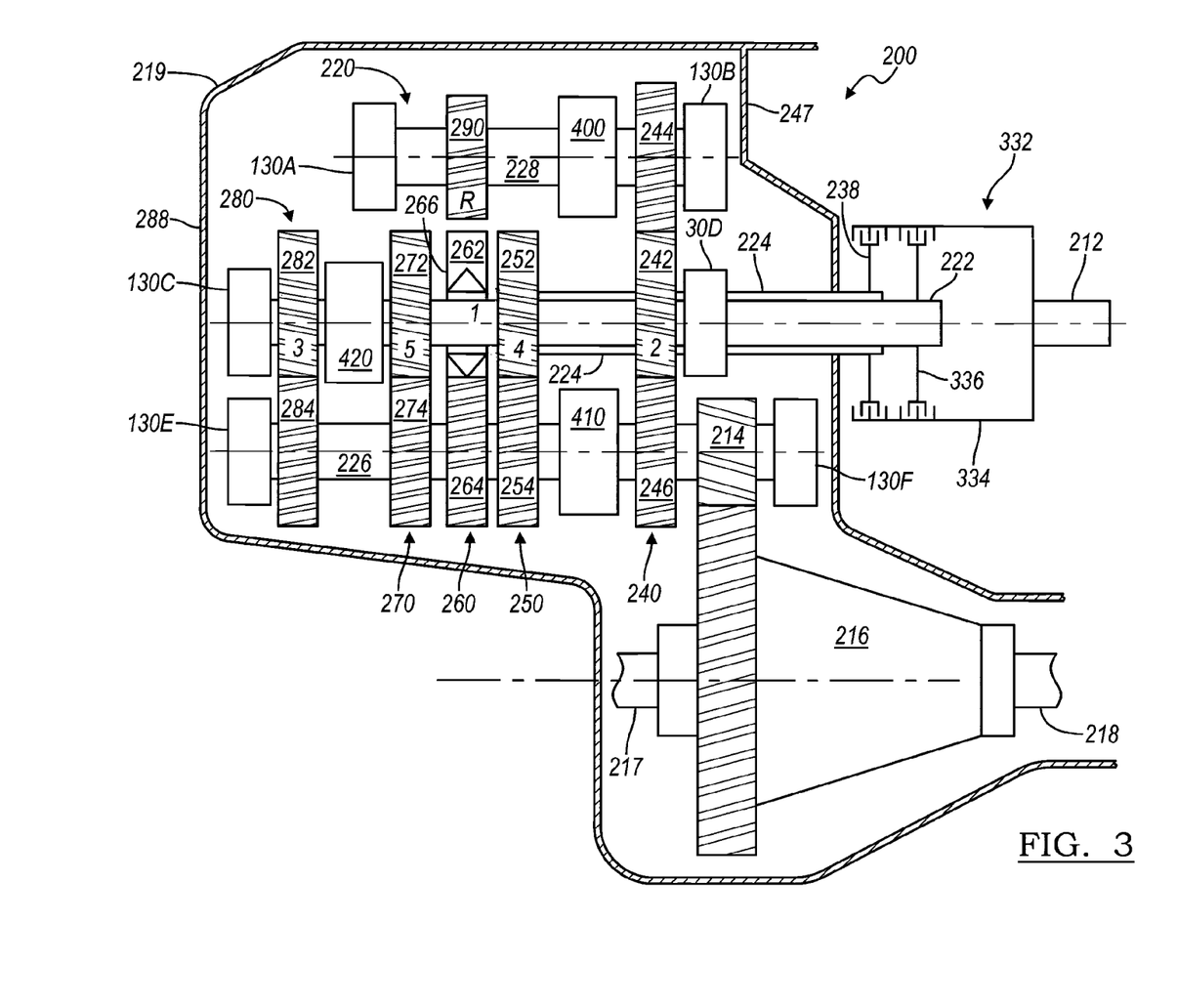
FIG. 3 is a side cross-sectional view of yet another embodiment of a transmission in accordance with the present invention.

Referring now to FIG. 3, another embodiment of a transmission in accordance with the present invention is provided and generally designated by reference number 200. Transmission 200 includes an input member 212 and an output member or transfer gear 214. In the present embodiment, the input member 212 is a shaft and the transfer gear 214 is a gear. However, those skilled in the art will appreciate that the input member 212 may be components other than shafts and the output member 214 may be a component, such as a shaft, other than a gear.

The input member 212 is continuously connected with an engine (not shown) or other torque producing machine to provide a driving torque to rotate input member 212. The output member or transfer gear 214 rotatably drives a final drive assembly 216. The final drive assembly 216 transfers torque delivered by transfer gear 214 to first and second side axles 217, 218, and on to road wheels (not shown) coupled to side axles 217, 218.

The transmission 200 includes a housing 219 that at least partially encloses a gearing arrangement 220. The gearing arrangement 220 includes various shafts or members, co-planar intermeshing gear sets, a dual clutch assembly, and selectively engageable synchronizers, as will be described herein. For example, the gearing arrangement 220 includes a first shaft or member 222, a second shaft or member 224, a layshaft 226, and a reverse shaft or member 228. The second shaft or member 224 is a sleeve shaft that is concentric with and overlies the first shaft or member 222. The layshaft 226 and the reverse member 228 are each spaced apart from and parallel with the first and second shaft members 222, 224. The first and second shafts 222, 224 define a first axis of rotation and the layshaft 226 defines a second axis of rotation. Shaft members 222, 224 and layshaft 226 are rotatably supported by bearings 130a, 130b, 130c, 130d, 130e and 130f.

A dual clutch assembly 332 is connected between the input member 212 and the first and second shaft members 222, 224. The dual clutch assembly 332 includes a clutch housing 334 connected for common rotation with the input member 212. Further, the dual clutch assembly 332 has first and second clutch elements or hubs 336 and 338. Clutch elements 336 and 338 together with the clutch housing 334 are configured to form a friction clutch, as is known in the art as a dual clutch. More specifically, clutch elements 336, 338 and the clutch housing 334 have friction plates mounted thereon that interact to form a friction clutch. The clutch element 336 is connected for common rotation with the first shaft member 222 and the clutch element 338 is connected for common rotation with the second shaft member 224. Thus, selective engagement of clutch element 336 with the clutch housing 334 connects the input member 212 for common rotation with the first shaft member 222. Selective engagement of clutch element 338 with the clutch housing 334 connects the input member 212 for common rotation with the second shaft member 224.

The gearing arrangement 220 also includes a plurality of co-planar, intermeshing gear sets 240, 250, 260, 270 and 280. Co-planar gear set 240 includes gear 242, gear 244 and gear 246. Gear 242 is connected for common rotation with the second shaft member 224 and intermeshes with gear 244 and 246. Gear 244 is selectively connectable for common rotation with the reverse shaft 228. Gear 246 is selectively connectable for common rotation with the layshaft 226. It should be appreciated that gear 242 may be a separate gear structure fixed to the second shaft member 224 or gear teeth/splines formed on an outer surface of the second shaft member 224 without departing from the scope of the present invention. Gear set 240 is located adjacent a wall 247 of the transmission housing 219 proximate a front or side of the transmission 200.

Co-planar gear set 250 includes gear 252 and gear 254. Gear 252 is selectively connectable for common rotation with the second shaft member 224 and intermeshes with gear 254. Gear 254 is connected for common rotation with the layshaft 226. Gear set 250 is located adjacent gear set 240.

Co-planar gear set 260 includes gear 262 and gear 264. Gear 262 is selectively connectable for common rotation with the first shaft member 222 and intermeshes with gear 264. More specifically, gear 262 is mounted to a one way clutch 266 that selectively couples gear 262 to first shaft 222. Gear 264 is connected for common rotation with the layshaft 226. Gear set 260 is disposed adjacent gear set 250.

Co-planar gear set 270 includes gear 272 and gear 274. Gear 272 is selectively connectable for common rotation with the first shaft member 222 and intermeshes with gear 274. Gear 274 is connected for common rotation with the layshaft 226. Gear set 270 is located adjacent gear set 260.

Co-planar gear set 280 includes gear 282 and gear 284. Gear 282 is selectively connectable for common rotation with the first shaft member 222 and intermeshes with gear 284. Gear 284 is connected for common rotation with the layshaft 226. Gear set 280 is positioned between gear set 270 and an end wall 288 of the transmission housing 219.

Reverse gear 290 is connected for common rotation with the reverse shaft member 228 and intermeshes with gear 264 of gear set 260. Reverse gear 290 is positioned between gear set 250 and gear set 270.

Finally, the transfer gear 214 is connected for common rotation with the layshaft 226. The transfer gear 214 is located between gear 246 and bearing 130f.

The transmission 200 further includes a plurality of selectively engageable synchronizer assemblies 400, 410 and 420. Synchronizer 400 is a single sided synchronizer that generally include a shift fork (not shown) that is bi-directionally translated by an actuator (not shown) into one engaged position and a neutral or disengaged position. For example, synchronizer 400 is selectively engageable to connect gear 244 with the reverse shaft 228 for common rotation therewith. In a preferred embodiment, synchronizer 400 has only one actuator.

Synchronizers 410, 420 are double sided synchronizers and generally include a shift fork (not shown) that is bi-directionally translated by an actuator (not shown) into at least two engaged positions and a neutral or disengaged position. For example, synchronizer 410 is selectively engageable to connect gear 246 with the layshaft member 226 for common rotation therewith and is selectively engageable to connect gear 254 with the layshaft member 226 for common rotation therewith. Synchronizer 420 is selectively engageable to connect gear 272 with the first shaft member 222 for common rotation therewith and is selectively engageable to connect gear 282 with the first shaft member 222 for common rotation therewith. Alternatively, synchronizer 420 may be located on layshaft 226 to selectively engage gears 274 and 284 to layshaft 226, in which case, gears 272 and 282 would be rotatably fixed to second shaft 222.

The transmission 200 is capable of transmitting torque from the input shaft 212 to the transfer gear 214 in at least five forward torque ratios and at least one reverse torque ratio. Each of the forward torque ratios and the reverse torque ratio is attained by selective engagement of the dual clutch assembly 332 and one or more of the synchronizer assemblies 400, 410 and 420. Those skilled in the art will readily understand that a different speed ratio is associated with each torque ratio.

It should be appreciated that each individual gear set 240, 250, 260, 270 and 280 provides one or more forward and/or reverse gear ratios upon selective engagement of the synchronizer assemblies 400, 410 and 420 and that which synchronizer and which gear set are associated with which forward or reverse speed ratio may vary without departing from the scope of the present invention.

For example, to establish the reverse torque ratio, clutch element 338 is engaged to couple the input member 212 with the second shaft member 224. Synchronizer 400 is engaged to connect gear 244 to reverse shaft member 228. Input torque from the input shaft 212 is transferred through the dual clutch assembly 332 to the second shaft member 224, through gear 242 to gear 244, through the reverse shaft member 228 to gear 290, from gear 290 to gear 264, and through the layshaft 226 to the transfer gear 214.

To establish a first forward torque ratio (i.e. a 1st gear), clutch element 338 is engaged to couple the input member 212 with the second shaft member 224. Input torque from the input member 212 is transferred through the dual clutch assembly 332 to the second shaft member 224 and through the one-way clutch 266 to gear 262. Gear 262 transfers torque to gear 264 which transfers the torque to the layshaft 226 and onto the transfer gear 214.

To establish a second forward torque ratio (i.e. a 2nd gear), clutch element 338 is engaged to couple the input member 212 to the second shaft member 224. Synchronizer 410 is activated to couple gear 246 to the layshaft member 226. One-way clutch 266 is over run disengaging gear 262 from second shaft 224. Accordingly, input torque from the input member 212 is transferred through the dual clutch assembly 332 to the second shaft member 224, through gear 242 to gear 246, and then through the layshaft 226 to the transfer gear 214.

To establish a third forward torque ratio (i.e. a 3rd gear), clutch element 336 is engaged to couple the input member 212 to the first shaft member 222. Synchronizer 420 is active to couple gear 282 to the first shaft member 222. Thus, input torque from the input member 212 is transferred through the dual clutch assembly 332 to the first shaft member 222, through gear 282 to gear 284, and through the layshaft 226 to the transfer gear 214.

To establish a fourth forward torque ratio (i.e. a 4th gear), clutch element 338 is engaged to couple the input member 212 to the second shaft member 224 and synchronizer 410 is activated to couple gear 254 to the layshaft member 226. Accordingly, input torque from the input member 212 is transferred through the dual clutch assembly 332 to the second shaft member 224 and to gear 252. Thus, torque is transferred to layshaft 226 through gear 254, and then through the layshaft 226 to the transfer gear 214.

To establish a fifth forward torque ratio (i.e. a 5th gear), clutch element 336 is engaged to couple the input member 212 to the first shaft member 222 and synchronizer 420 is engaged to couple gear 272 to the first shaft member 222. Accordingly, input torque from the input member 212 is transferred through the dual clutch assembly 332 to the first shaft member 222, through gear 272 to gear 274, and through the layshaft 226 to the transfer gear 214.

Of course, the present invention contemplates modifications and alternative embodiments. For example, an alternate arrangement of the gears is contemplated. More specifically, gear sets 70 and 80 may change position with each other. Moreover, gear sets 40 and 50 may swap position and gear set 60 may be located on either side of gear set 40 and 50.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a first, second, third, fourth, and fifth gear set, wherein the first gear set has a first gear and a second gear, the second gear set has a first gear and a second gear, the third gear set has a first gear and a second gear, the fourth gear set has a first gear and a second gear, the fifth gear set has a first gear, a second gear and a third gear;
   a first interconnecting member continuously connected to the first gear of the second and fourth gear sets;
   a second interconnecting member selectively connectable with the first gear of the first, third and fifth gear sets and wherein the first interconnecting member is concentric with the second interconnecting member;
   a reverse shaft spaced apart from and parallel with the first and second interconnecting members, and wherein the second gear of the fifth gear set is selectively connectable to the reverse shaft;
   a reverse gear continuously connected to the reverse shaft;
   a countershaft continuously connected to the output member, the second gear of the third gear set, the second gear of the fifth gear set and selectively connectable with the second gear of the fourth gear set and third gear of the fifth gear set;
   a dual clutch assembly selectively engageable to interconnect the input member with at least one of the first interconnecting member and the second interconnecting member; and
   three synchronizer assemblies for selectively connecting at least one of the gears of the first, second, third, fourth and fifth gear sets with at least one of the first interconnecting member, the second interconnecting member, the reverse shaft, and the countershaft, and
   wherein the dual clutch assembly and three synchronizer assemblies are selectively engageable in combinations of at least two to establish at least five forward speed ratios and at least one reverse speed ratio between the input member and the output member.

2. The transmission of claim 1 wherein the dual clutch assembly includes a first clutch for selectively connecting the input member with the first interconnecting member and a second clutch for selectively connecting the input member with the second interconnecting member.

3. The transmission of claim 1 wherein the first gears of the first, second, third and fourth gear sets intermesh with the second gears of the first, second, third and fourth gear sets, and wherein the first gear of the fifth gear set intermeshes with the second gear and the third gear of the fifth gear set and wherein the reverse gear intermeshes with the second gear of the third gear set.

4. The transmission of claim 1 wherein a first of the three synchronizer assemblies selectively connects the second gear of the fifth gear set to the reverse shaft to establish a reverse gear ratio.

5. The transmission of claim 1 wherein a second of the three synchronizer assemblies selectively connects one of the first gear of the first gear set and first gear of the second gear set to the second interconnecting member.

6. The transmission of claim 5 wherein a second of the three synchronizer assemblies selectively connects the first gear of the first gear set to the second interconnecting member to establish a third gear ratio.

7. The transmission of claim 6 wherein a second of the three synchronizer assemblies selectively connects the first gear of the second gear set to the second interconnecting member to establish a fifth gear ratio.

8. The transmission of claim 1 wherein a third of the three synchronizer assemblies selectively connects one of the second gear of the fourth gear set and the third gear of the fifth gear set to the countershaft.

9. The transmission of claim 8 wherein a third of the three synchronizer assemblies selectively connects the second gear of the fourth gear set to the countershaft to establish a fourth gear ratio.

10. The transmission of claim 8 wherein a third of the three synchronizer assemblies selectively connects the third gear of the fifth gear set to the countershaft to establish a second gear ratio.

11. The transmission of claim 1 wherein the first gear set is adjacent the dual clutch assembly, the second gear set is adjacent the first gear set, the third gear set is adjacent the second gear set, the fourth gear set is adjacent the third gear set, and the fifth gear set is adjacent the fourth gear set.

12. The transmission of claim 1 wherein the output member is connected to the countershaft at a location between the second gear of the first gear set and an end bearing that rotatably supports an end of the countershaft.

13. The transmission of claim 1 wherein the output member is connected to the countershaft at a location between the second gear of the first gear set and second gear of the second gear set.

14. The transmission of claim 1 further comprising a one-way clutch disposed between the first gear of the third gear set for selectively connecting the first gear of the third gear set to the second interconnecting member.

15. A transmission comprising:
   an input member;
   an output member;
   a first, second, third, fourth, and fifth gear set, wherein the first gear set has a first gear, a second gear and a third gear, the second gear set has a first gear and a second gear, the third gear set has a first gear and a second gear, the fourth gear set has a first gear and a second gear, the fifth gear set has a first gear and a second gear;
   a first interconnecting member continuously connected to the first gear of the fourth and fifth gear sets;
   a second interconnecting member selectively connectable with the first gear of the first, second and third gear sets, wherein the first interconnecting member is concentric with the second interconnecting member;

a reverse shaft spaced apart from and parallel with the first and second interconnecting members, and wherein the second gear of the first gear set is selectively connectable to the reverse shaft;

a reverse gear continuously connected to the reverse shaft;

a countershaft continuously connected to the output member, the second gear of the third gear set, the second gear of the fourth gear set, the second gear of the fifth gear set and selectively connectable with the second gear of the first gear set and the third gear of the second gear set;

a dual clutch assembly selectively engageable to interconnect the input member with at least one of the first interconnecting member and the second interconnecting member; and three synchronizer assemblies for selectively connecting at least one of the gears of the first, second, third, fourth and fifth gear sets with at least one of the first interconnecting member, the second interconnecting member, the reverse shaft, and the countershaft, and wherein the dual clutch assembly and three synchronizer assemblies are selectively engageable in combinations of at least two to establish at least five forward speed ratios and at least one reverse speed ratio between the input member and the output member.

16. The transmission of claim 15 wherein the first gear set is adjacent the dual clutch assembly, the second gear set is adjacent the first gear set, the third gear set is adjacent the second gear set, the fourth gear set is adjacent the third gear set, and the fifth gear set is adjacent the fourth gear set.

17. The transmission of claim 15 wherein the dual clutch assembly includes a first clutch for selectively connecting the input member with the first interconnecting member and a second clutch for selectively connecting the input member with the second interconnecting member.

18. The transmission of claim 17 wherein a first of the three synchronizer assemblies selectively connects the second gear of the first gear set to the reverse shaft to establish a reverse gear ratio.

19. The transmission of claim 17 wherein a second of the three synchronizer assemblies selectively connects one of the third gear of the first gear set and second gear of the second gear set to the countershaft.

20. The transmission of claim 19 wherein a second of the three synchronizer assemblies selectively connects the third gear of the first gear set to the countershaft to establish a second gear ratio.

21. The transmission of claim 19 wherein a second of the three synchronizer assemblies selectively connects the second gear of the second gear set to the countershaft to establish a fourth gear ratio.

22. The transmission of claim 17 wherein a third of the three synchronizer assemblies selectively connects one of the first gear of the fourth gear set and the first gear of the fifth gear set to the first interconnecting member.

23. The transmission of claim 22 wherein a third of the three synchronizer assemblies selectively connects the first gear of the fourth gear set to the first interconnecting member to establish a fifth gear ratio.

24. The transmission of claim 22 wherein a third of the three synchronizer assemblies selectively connects the first gear of the fifth gear set to the first interconnecting member to establish a third gear ratio.

25. A transmission comprising:

an input member;

an output member;

a first, second, third, fourth, and fifth gear set, wherein the first gear set has a first gear and a second gear, the second gear set has a first gear and a second gear, the third gear set has a first gear and a second gear, the fourth gear set has a first gear and a second gear, the fifth gear set has a first gear, a second gear and a third gear;

a first interconnecting member continuously connected to the first gear of the second and fourth gear sets;

a second interconnecting member selectively connectable with the first gear of the first, third and fifth gear sets and wherein the first interconnecting member is concentric with the second interconnecting member;

a reverse shaft spaced apart from and parallel with the first and second interconnecting members, and wherein the second gear of the fifth gear set is selectively connectable to the reverse shaft;

a reverse gear continuously connected to the reverse shaft;

a countershaft continuously connected to the output member, the second gear of the third gear set, the second gear of the fifth gear set and selectively connectable with the second gear of the fourth gear set and third gear of the fifth gear set;

a dual clutch assembly selectively engageable to interconnect the input member with at least one of the first interconnecting member and the second interconnecting member and wherein the dual clutch assembly includes a first clutch for selectively connecting the input member with the first interconnecting member and a second clutch for selectively connecting the input member with the second interconnecting member; and three synchronizer assemblies for selectively connecting at least one of the gears of the first, second, third, fourth and fifth gear sets with at least one of the first interconnecting member, the second interconnecting member, the reverse shaft, and the countershaft, and wherein the dual clutch assembly and three synchronizer assemblies are selectively engageable in combinations of at least two to establish at least five forward speed ratios and at least one reverse speed ratio between the input member and the output member and wherein a first of the three synchronizer assemblies selectively connects the second gear of the fifth gear set to the reverse shaft to establish a reverse gear ratio, a second of the three synchronizer assemblies selectively connects one of the first gear of the first gear set and first gear of the second gear set to the second interconnecting member to establish at least one of a third and fifth gear ratio and a third of the three synchronizer assemblies selectively connects one of the second gear of the fourth gear set and the third gear of the fifth gear set to the countershaft to establish at least one of a second and fourth gear ratio.

* * * * *